Patented Sept. 6, 1932

1,875,747

UNITED STATES PATENT OFFICE

JEROME MARTIN AND LLOYD C. SWALLEN, OF TERRE HAUTE, INDIANA, ASSIGNORS TO COMMERCIAL SOLVENTS CORPORATION, OF TERRE HAUTE, INDIANA, A CORPORATION OF MARYLAND

PRODUCTION OF METHYLAMINE

No Drawing.   Application filed July 18, 1930.   Serial No. 468,993.

This invention relates to a process for producing methyl amine from ammonia and methanol. It relates particularly to a process whereby high conversions of the reactants and good yields of monomethyl amine are obtained.

In the past methyl amine has been prepared synthetically by a number of different methods, among which is the process of using ammonia and methanol as the reactants. Sabatier and Maihle (Compt. rend. 148, 898 (1909)) reported that various alcohols react with ammonia when the vapors are passed over thorium oxide or blue tungstic oxide at 350°–370° C., water being eliminated and the primary and secondary and some tertiary amine formed, but these investigators did not actually use methanol. Smolenski (Rocz. Chem. 1921, 1, 232–43) stated that when the vapors of methyl, ethyl, or amyl alcohol react with ammonia in the presence of a dehydrating catalyst such as alumina at about 300 C., a satisfactory yield of primary, secondary, and tertiary amines is obtained, but that secondary products such as olefines and ethers are obtained. Davis and Elderfield (J. Am. Chem. Soc. 50, (1928), 1786) reported that methyl amine is formed when methanol and ammonia are passed over a hot thorium oxide catalyst, the best temperature appearing to be 325–330° C. and the best relative concentration about 0.80–0.83 mol of ammonia per mol of methanol. These investigators reported that under the best conditions nearly one-third of the methanol is converted into methyl amine. They also stated that no secondary or tertiary amines were produced. This statement as well as the yields reported by these investigators are believed to be inaccurate and misleading due to the unsatisfactory methods of analysis used by them.

In determining the value of a process for the production of methyl amine on a commercial scale it is necessary to consider several important points, for example, the rate of conversion of the ammonia and methanol, the extent of side reactions giving products other than methyl amine, and the ratios of the different methyl amines formed during the reaction. The latter point is of particular importance due to the difficulty in separating and recovering the different amines and to the uses to which the different amines may be applied. Extensive investigations have shown that up to the present time it is not possible to react ammonia and methanol and obtain only the monomethyl amine as has been claimed by prior workers. According to the present invention, however, it is shown that the ratios of the different methyl amines found by the reaction between ammonia and methanol may be regulated within certain determined limits by careful regulation of such factors as catalyst, rate of flow of reactants, temperature, ratio of ammonia to methanol, etc.

It has now been found that materials such as aluminium silicate either pure or in the form of naturally occurring clays like "blue clay", "doucil", "Putnam clay", "Indianaite", feldspar, crushed building tile, etc. may be satisfactorily used as catalysts for the production of methyl amine from ammonia and methanol.

In selecting a catalyst for industrial use it is necessary to consider such factors as availability, initial cost, physical structure, chemical composition, necessity of subjecting material to preliminary purification or other treatment before it can be satisfactorily used as a catalyst, duration of life of the catalyst, possibility and ease of reactivation, catalysis of undesirable side-reactions, etc. Catalysts such as those which have just been enumerated meet these requirements in a most satisfactory manner. Clays containing aluminium silicate are among the most widely distributed substances in nature and are hence both easily obtainable and cheap. In fact, they can be obtained so cheaply that the factors of reactivation and duration of life of the catalyst become of comparatively little importance. They also give good conversions of the reactments and at the same time do not unduly catalyze undesirable side reactions.

The procedure by which methyl amine is obtained according to the present invention may be illustrated as follows:—The operation consists broadly in admitting ammonia gas and methanol to a vaporizer heated by suitable means. The temperature required at this point may, for example, be maintained by heating the vaporizer by means of the vapors of boiling butanol or other liquid of suitable boiling point. This procedure, however, is not essential to the successful operation of the process, and any other satisfactory means of heating may be employed. In any case, the mixed gases—ammonia and methanol—are then passed at the required rate thru the reactor containing the heated catalyst and finally suitably treated so as to recover and separate the methyl amine from the unconverted ammonia, methanol, water and any by-products which may be formed during the reaction. Any suitable method of recovery may be employed, as for example, the gases leaving the reaction vessel may be absorbed in concentrated hydrochloric acid, and the resulting amine hydrochlorides separated and the desired amines obtained. Or, if preferred, the amines may be separated and recovered by fractional distillation under pressure according to the procedure outlined in a co-pending application.

Results showing the use of aluminium silicate and clays as catalysts under varying conditions are shown in the following table.

Table I

| Catalyst | Temp. °C. | Mols $NH_3$ / Mols MeOH | Space velocity | Conv. of $NH_3$ | Monoamine in product % |
|---|---|---|---|---|---|
| (a) Indianaite | 450 | 1.57 | 140 | 55 | 35 |
| (a) Indianaite | 400 | 0.50 | 100 | 60 | 60 |
| (a) Indianaite | 400 | 1.00 | 100 | 60 | |
| (b) Crushed building tile | 450 | 1.00 | 50 | 10 | |
| (b) Blue clay | 450 | 1.00 | 100 | 30 | |
| (c) Doucil | 400 | 0.50 | 100 | 57 | |
| (c) Feldspar | 400 | 0.50 | 100 | 45 | |
| (d) Putnam clay | 400 | 2.00 | 100 | 25 | 50–60 |
| (a) Indianaite | 450 | 2.00 | 1300 | 19 | 65 |

The composition of the above catalysts is shown in Table 2 which follows:

Table 2

(a) Indianaite—
  See Mellor—Comprehensive Treatise on Inorganic and Theoretical Chemistry (1924), vol. 6, p. 495.

(b) Blue clay—
  Alumina _____ 26.85
  Silica _____ 55.22
  $Fe_2O_3$ _____ 6.10
  $TiO_2$ _____ 1.06
  CaO _____ 2.15
  MgO _____ 1.07
  $Na_2O$ _____ 0.09
  $SO_3$ _____ 0.15
  $P_2O_5$ _____ 0.90
  Water _____ 6.42

(b) Crushed building tile—
  Prepared from blue clay by crushing, grinding and igniting at 2000° F.

(c) Doucil _____ Mellor Ibid vol. 6, p. 576.

(c) (Feldspar) ____ Mellor Ibid vol. 6, p. 661.

(d) Putnam clay—
  Silica _____ 45.39
  Alumina _____ 39.19
  $Fe_2O_3$ _____ 0.45
  CaO _____ 2.15
  MgO _____ 0.29
  Alkalies _____ 0.83
  Water _____ 14.01

Consideration of data obtained by operating under various conditions indicate that the final results obtained are regulated by the catalyst, the temperature at which the reaction is carried out, the ratio of the amount of ammonia to the amount of methanol passed over the catalyst, the space velocity of the gaseous mixture being reacted, as well as certain other factors to be discussed below. By the term "space velocity", as used above, is meant the number of cubic centimeters of reacting gases per cubic centimeter of catalyst passed over the latter per hour.

Variations of the factors above enumerated generally lead to changes in both the rates of conversion of the raw materials and in the ratio of monomethyl to the secondary and tertiary methyl amines, and hence these factors may be varied within certain limits as different products are desired or as the particular method of operation and recovery of the products may require. For example, the temperature of the catalyst may be varied from about 300° C. to about 500° C. For most purposes, however, it is preferable to operate within the range 350°–450° C., and better still at about 400° C.

The ratio of ammonia to methanol is to a very large extent determined by the method of operation and the economy of recovering the products formed during the reaction. By using a gas mixture consisting of say six parts of ammonia to one part of methanol approximately 95% of the methyl amine formed will be the monomethyl amine, but only approximately 7% of the ammonia will be converted, thus necessitating greatly increased expense in recovering the unused portions of the raw material. On the other hand, assuming that the other factors are left the same, if the gas mixture contains only about one part of ammonia to one part of methanol, the monomethyl amine content of the methyl amine formed will be reduced to approximately 30–40%, but the conversion of the ammonia to methyl amine will be increased to approximately 35–40%. By decreasing the ratio of ammonia to methanol still further, the proportion of monomethyl amine will be further decreased. In order, therefore, to obtain as high a proportion of monomethyl amine as possible under the most economical conditions it is necessary to assume an intermediate figure for the ammonia-methanol ratio. A ratio of approximately 2.2 appears to give about the most satisfactory results under general operating conditions.

The space velocity of the reacting gases may be varied from 50 to about 3500. The conversion at 500 is equal to that at 100, other conditions being the same. Above 1100 space velocity the conversion appears to begin to decrease.

The operating conditions and particularly the temperature employed depend to some extent also upon the catalytic effect of the metals from which the catalytic apparatus is constructed. Aluminium silicate and clay catalysts do not crack methanol at 400° C. but do begin to show some cracking above 425° C. When, however, the heated catalyst container is constructed of cast iron or cold rolled steel the cracking of the methanol is accelerated appreciably. On the other hand, when copper metal is employed there appears not only to be no increase in the cracking of the methanol at a given temperature, but there even appears to be a slight decrease in the tendency for this undesired reaction to take place. From a consideration of these factors, therefore, it is apparent that more satisfactory results are obtainable when the heated surfaces of the apparatus with which the reacting gases come into contact are constructed of copper metal rather than of iron or steel.

What is claimed is:

1. Process for the production of methyl amine which comprises passing a mixture of methanol and ammonia at temperatures ranging from 300° to 500° C. over catalysts comprising aluminium silicate, and recovering and separating the products thereby formed.

2. Process for the production of methyl amine which comprises passing a mixture of methanol and ammonia at approximately 400 C. over catalysts comprising aluminium silicate, and recovering and separating the products thereby formed.

3. Process for the production of methyl amine which comprises passing a gaseous mixture comprising one part methanol and one to six parts ammonia at temperatures ranging from 300° to 500° C. over catalysts comprising aluminium silicate, and recovering and separating the products thereby formed.

4. Process for the production of methyl amine which comprises passing a mixture of methanol and ammonia at temperatures ranging from 300° to 500° C. and at space velocities ranging from 50 to 3500 over catalysts comprising aluminium silicate, and recovering and separating the products thereby formed.

5. Process for the production of methyl amine which comprises passing a gaseous mixture comprising one part methanol and one to six parts ammonia at about 400° C. over catalysts comprising aluminium silicate, and recovering and separating the products thereby formed.

6. Process for the production of methyl amine which comprises passing a gaseous mixture comprising one part methanol and one to six parts ammonia at about 400° C. and at a space velocity of about 1100 over catalysts comprising aluminium silicate, and recovering and separating the products thereby formed.

7. In a process for the production of methyl amine, the steps which comprise passing a mixture of methanol and ammonia at temperatures ranging from 300° to 500° C. over catalysts comprising aluminium silicate.

8. In a process for the production of methyl amine, the steps which comprise passing a mixture of methanol and ammonia at temperatures ranging from 300° to 500° C. and at space velocities ranging from 50 to 3500 over catalysts comprising aluminium silicate.

9. In a process for the production of methyl amine, the steps which comprise passing a mixture of methanol and ammonia at about 400° C. and at a space velocity of about 1100 over catalysts comprising aluminium silicate.

10. In a process for the production of methyl amine, the steps which comprise passing a mixture of methanol and ammonia at temperatures ranging from 300° to 500° C. over catalysts comprising a clay.

11. In a process for the production of methyl amine, the steps which comprise passing a mixture of methanol and ammonia at temperatures ranging from 300° to 500° C. and at space velocities ranging from 50 to 3500 over catalysts comprising a clay.

12. In a process for the production of methyl amine, the steps which comprise passing methanol and a molecular excess of ammonia at temperatures ranging from 300° to 500° C. and at space velocities ranging from 50 to 3500 over catalysts comprising a clay.

13. In a process for the production of monomethyl amine, the steps which comprise passing methanol and a molecular excess of ammonia at temperatures ranging from 300° to 500° C. and at space velocities ranging from 50 to 3500 over catalysts comprising a clay.

In testimony whereof we affix our signatures.

JEROME MARTIN.
LLOYD C. SWALLEN